(12) United States Patent
Jones

(10) Patent No.: US 9,859,729 B1
(45) Date of Patent: Jan. 2, 2018

(54) UNIVERSAL CELL CHARGING STATION SYSTEM

(71) Applicant: Counter Power Products, LLC, Clearwater, FL (US)

(72) Inventor: Ryan C. Jones, Dunedin, FL (US)

( * ) Notice: Subject to any disclaimer, the term of this patent is extended or adjusted under 35 U.S.C. 154(b) by 179 days.

(21) Appl. No.: 14/930,253

(22) Filed: Nov. 2, 2015

(51) Int. Cl.
*H02J 7/00* (2006.01)
*H02J 7/02* (2016.01)
*H04W 88/02* (2009.01)

(52) U.S. Cl.
CPC .......... *H02J 7/0044* (2013.01); *H02J 7/0027* (2013.01); *H02J 7/025* (2013.01); *H04W 88/02* (2013.01)

(58) Field of Classification Search
CPC ........ H02J 7/0044; H02J 7/0027; H02J 7/025; H04W 88/02
See application file for complete search history.

(56) References Cited

U.S. PATENT DOCUMENTS

| | | | | |
|---|---|---|---|---|
| 8,210,356 B1* | 7/2012 | Krull | ...................... | A47B 21/00 206/214 |
| 2013/0041730 A1* | 2/2013 | LoBianco | ............... | G09F 13/00 705/14.4 |
| 2014/0300273 A1* | 10/2014 | LeBrun | ................... | G09F 23/06 315/76 |

* cited by examiner

*Primary Examiner* — Drew A Dunn
*Assistant Examiner* — Sailesh Thapa
(74) *Attorney, Agent, or Firm* — Patrick A. Reid

(57) ABSTRACT

A container has a bottom panel, left and right side panels, front and rear panels, and an open top to facilitate the removable receipt of individual objects. A lower support tray is positionable upon a recipient surface. The tray has a front edge, a rear edge, and laterally spaced side edges. An intermediate chamber has a front, a back, lateral sides, a top and a bottom. Wires have interior ends within the chamber. Each wire has an exterior end in proximity to the tray for charging electronic devices.

1 Claim, 7 Drawing Sheets

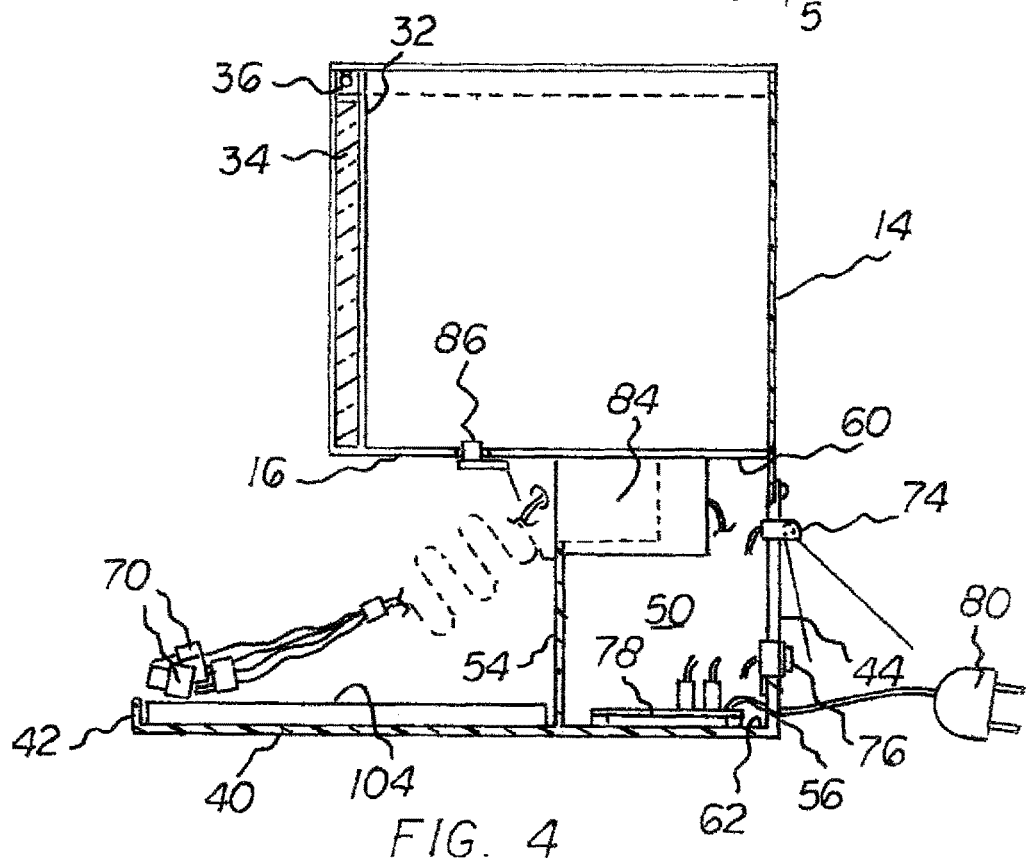

FIG. 5
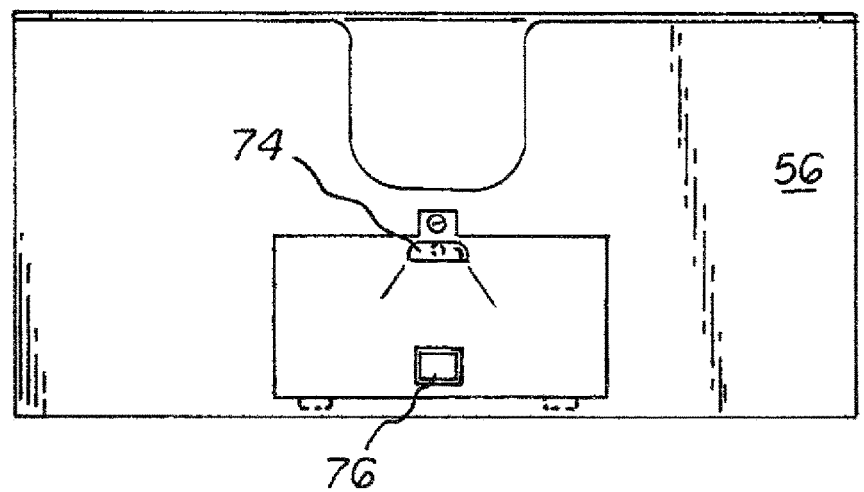
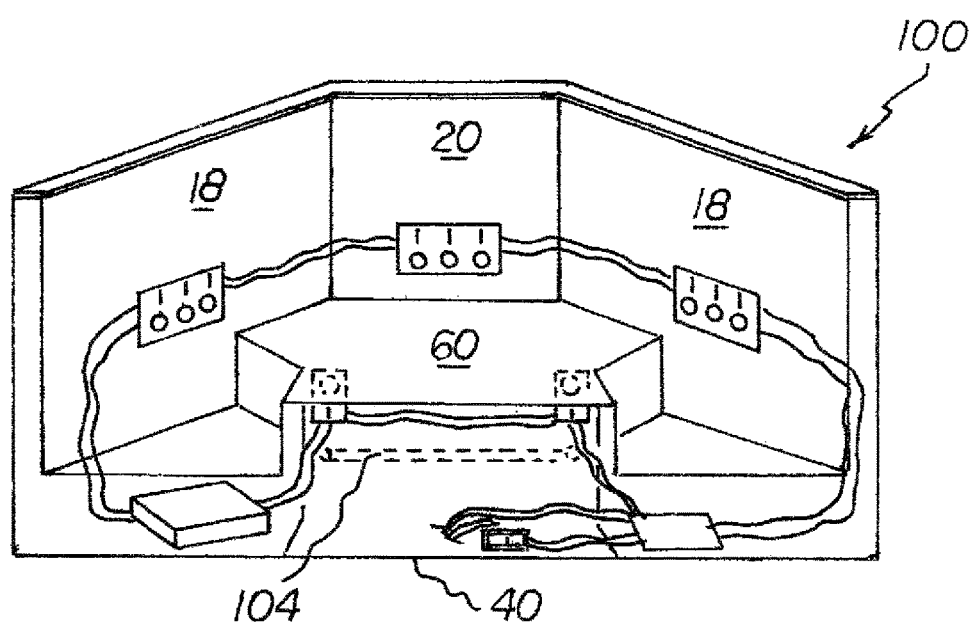
FIG. 6

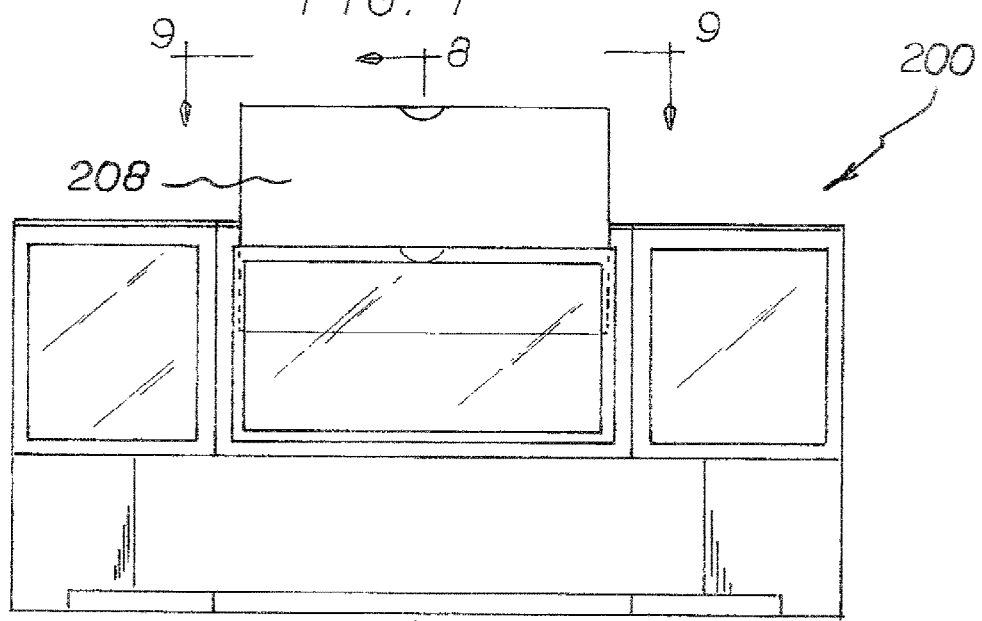
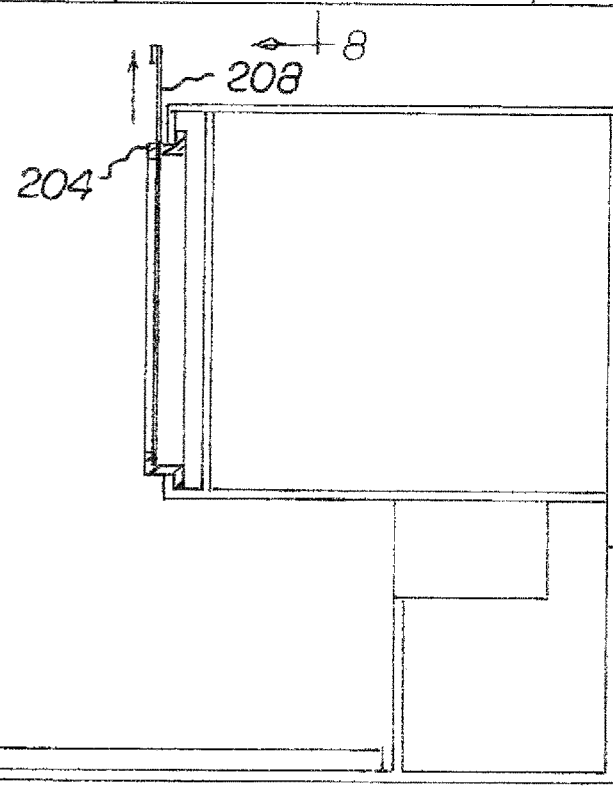

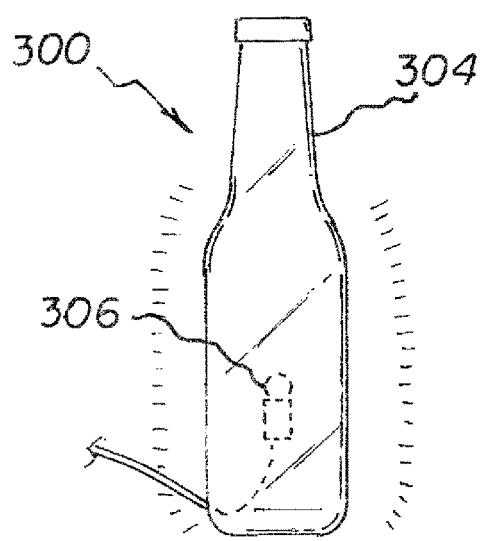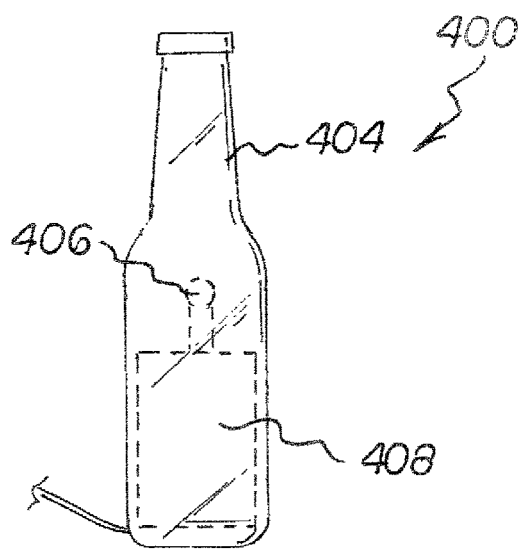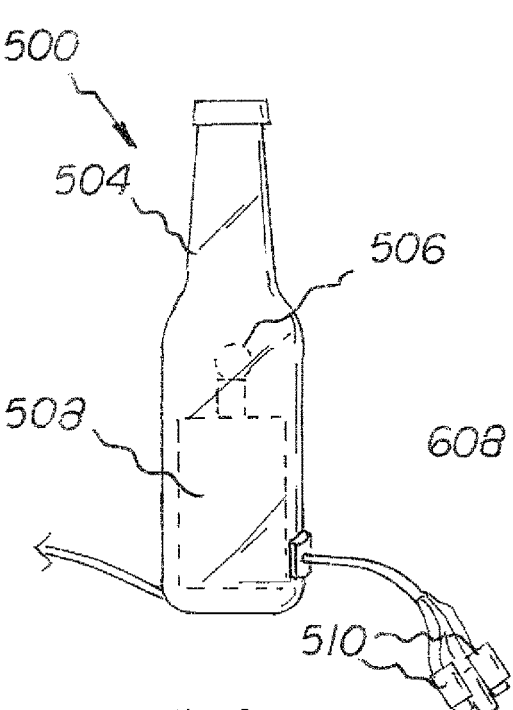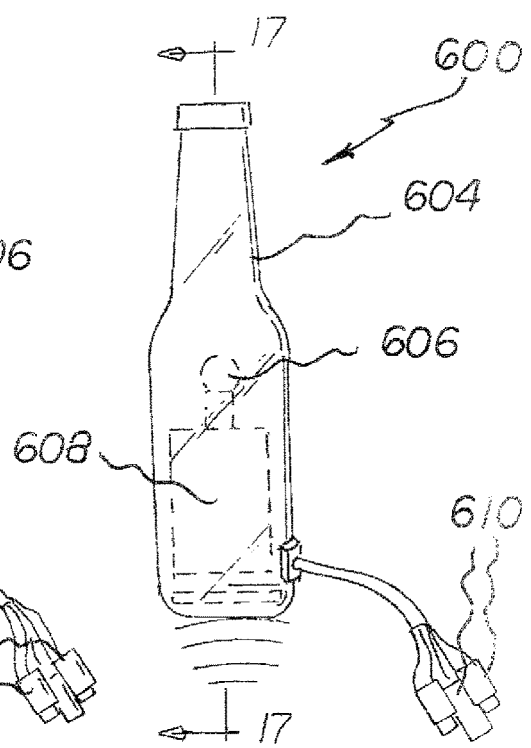

UNIVERSAL CELL CHARGING STATION SYSTEM

BACKGROUND OF THE INVENTION

Field of the Invention

The present invention relates to a universal cell charging station system and more particularly pertains to removably supporting disposable objects, such as napkins, straws, stirrers and the like, and selectively charging a wide variety of hand-held electronic devices, including cell phones, the supporting and charging being done in a safe, convenient, and economical manner.

SUMMARY OF THE INVENTION

In view of the disadvantages inherent in the known types of charging stations of known designs and configurations now present in the prior art, the present invention provides an improved universal cell charging station system. As such, the general purpose of the present invention, which will be described subsequently in greater detail, is to provide a new and improved universal cell charging station system and method which has all the advantages of the prior art and none of the disadvantages.

To attain this, the present invention essentially comprises an upper container having a bottom panel, left and right side panels, front and rear panels, and an open top to facilitate the removable receipt of individual objects. A lower support tray is positionable upon a recipient surface. The tray has a front edge, a rear edge, and literally spaced side edges. An intermediate chamber has a front, a back, lateral sides, a top and a bottom. Wires have interior ends within the chamber. Each wire has an exterior end in proximity to the tray for charging electronic devices.

There has thus been outlined, rather broadly, the more important features of this invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved universal cell charging station system which has all of the advantages of the prior art charging stations of known designs and configurations and none of the disadvantages.

It is another object of the present invention to provide a new and improved universal cell charging station system which may be easily and efficiently manufactured and marketed.

It is a further object of the present invention to provide a new and improved universal cell charging station system which is of durable and reliable constructions.

As even further object of the present invention is to provide a new and improved universal cell charging station system which is susceptible of a low cost of manufacture with regard to both materials and labor, and which accordingly is then susceptible of low prices of sale to the consuming public, thereby making such universal cell charging station system economically available to the buying public.

Lastly, another object of the present invention is to provide a universal cell charging station system for removably supporting disposable objects, such as napkins, straws, stirrers and the like, and selectively charging a wide variety of hand-held electronic devices, including cell phones, the supporting and charging being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

DRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the system taken along line 3-3 of FIG. 1.

FIG. 4 is a cross sectional view of the system taken along line 4-4 of FIG. 1.

FIG. 5 is a rear elevational view of the system taken along line 5-5 of FIG. 4.

FIG. 6 is a rear elevational view of the invention with the rear panel removed but illustrating an alternate embodiment of the invention. FIG. 7 is a front elevational view of another alternate embodiment.

FIG. 8 is a cross sectional view taken along line 8-8 of the FIG. 7.

FIG. 13 is a side elevational view of a bottle with an internal bulb powered by the housing.

FIG. 14 is a side elevational view of a bottle with an internal bulb and a rechargeable battery powered by the housing.

FIG. 15 is a side elevational view of a bottle with an internal bulb and a rechargeable battery powered by the housing and with tips powered by the rechargeable battery.

FIG. 16 is a side elevational view of a bottle with an internal bulb and a rechargeable battery powered by the housing and with tips powered by the rechargeable battery wherein the rechargeable battery is powered by a wireless base.

The same reference numerals refer to the same parts throughout the various Figures.

DESCRIPTION OF THE EMBODIMENT

Figure 1:
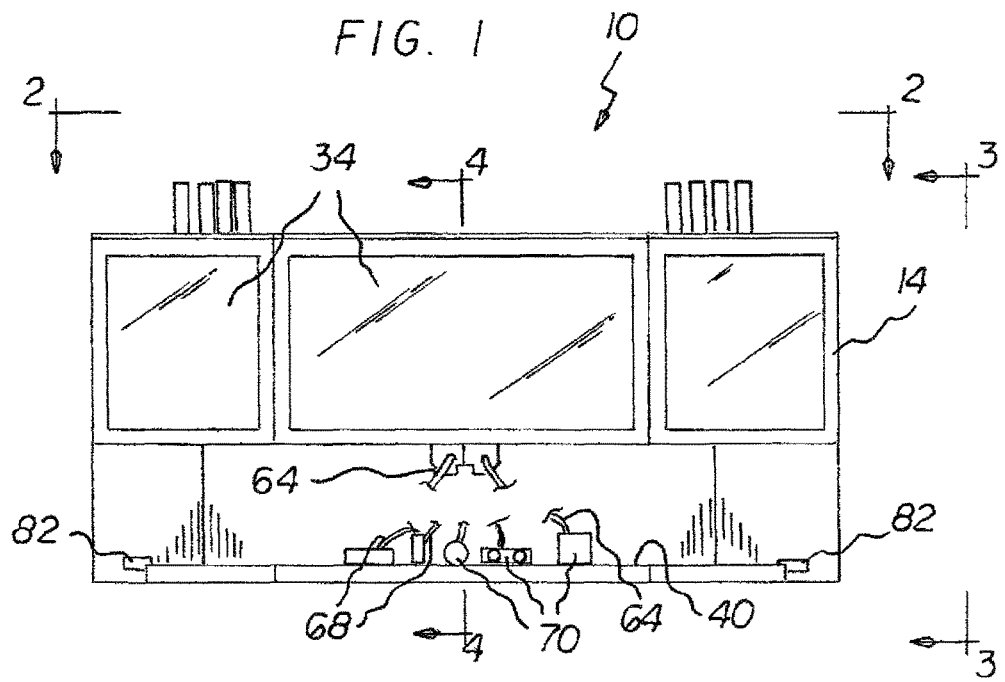
FIG. 1 is a front elevational view of a universal cell charging station system constructed in accordance with the principles of the present invention.
Figure 2:
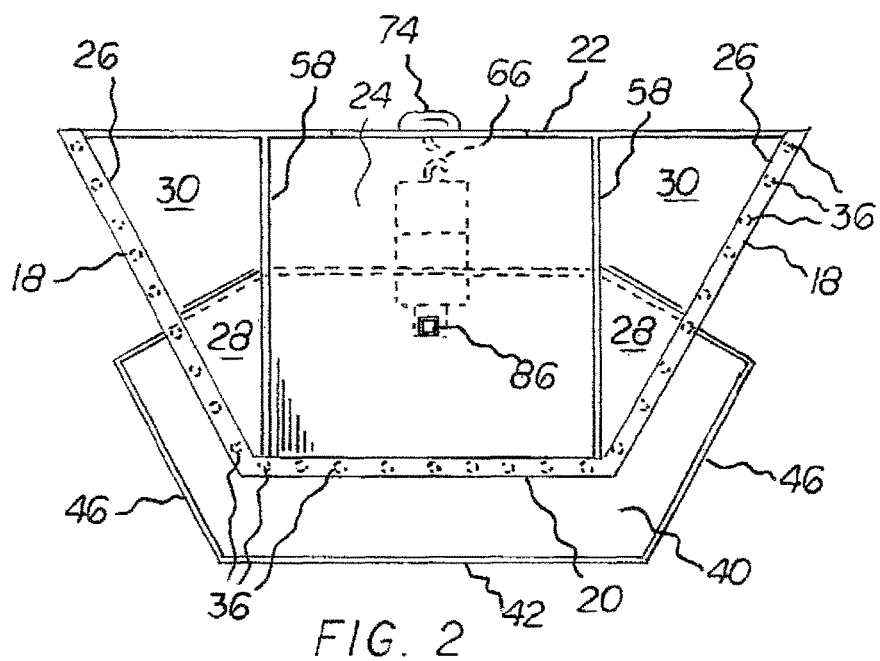
FIG. 2 is a plan view of the system taken along line 2-2 of FIG. 1.
Figure 9:
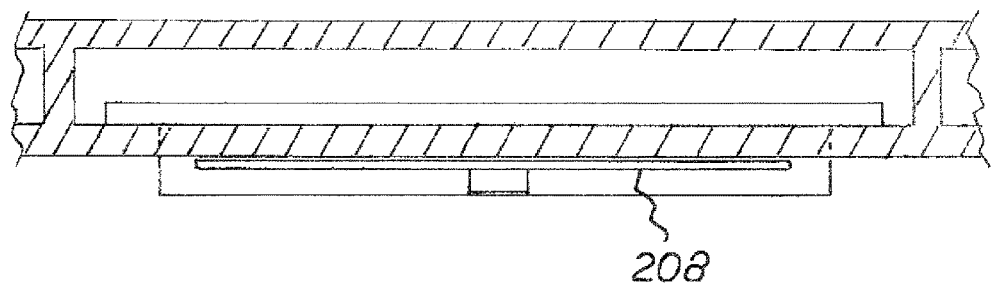
FIG. 9 is a plan view of the central section taken along line 9-9 of FIG. 7.
Figure 10:
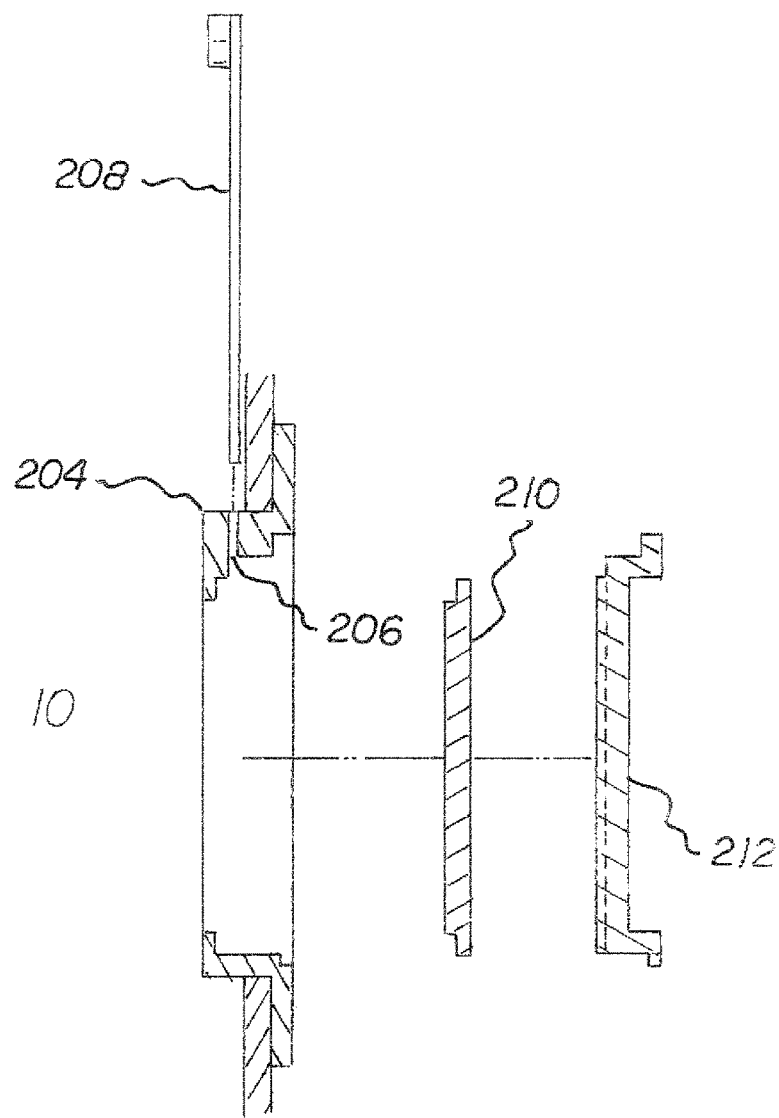
FIG. 10 is an exploded cross sectional view of the upper forward section of FIG. 8.

With reference now to the drawings, and in particular to FIG. 1 thereof, the preferred embodiment of the new and improved universal cell charging station system embodying the principles and concepts of the present invention and generally designated by the reference numeral 10 will be described.

The present invention, the universal cell charging station system 10 is comprised of a plurality of components. Such components in their broadest context include an upper container, a lower support tray, and an intermediate chamber. Such components are individually configured and correlated with respect to each other so as to attain the desired objective.

First provided is an upper container 14. The upper container has a horizontal bottom panel 16. The upper container has left and right side panels 18. The upper container has a front panel 20 and a rear panel 22. The upper container has a rectangular central section 24. The upper container also has laterally spaced triangular side section 26. Each side section has a forward region 28. The forward region has a shallow first depth. Each side section has a rearward region 30. The rearward region has a deep second depth. The second depth is greater than the first depth. Each section has an open top. In this manner the removable receipt of the napkins and the like in the central section is facilitated. Also in this manner the removable receipt of straws and the like in the rearward regions of the side sections is facilitated. Further in this manner the removable receipt of short items such as stirrers in the forward region of each of the side sections is facilitated. Each side panel forms an angle of 60 degrees with the rear panel. Each side panel has a vertical pocket 32. In this manner advertising material may be removably received. The pockets have transparent exterior plates 34. The plates have light emitting diodes 36 above to illuminate the advertising material.

Provided next is a lower support tray 40. The tray is postitionable upon a recipient surface such as a counter, table top, and the like. The support tray has a front edge 42 and a rear edge 44. The rear edge of the support tray is vertically aligned with the rear panel of the container. The front edge of the support tray is vertically outwardly of the front panel of the container.

Further provided is an intermediate chamber 50. The chamber has a front 54 and a back 56. The chamber has lateral sides 58. The chamber has a top 60 and a bottom 62. The chamber has a plurality of charging wires 64. In this manner a wiring harness is formed. Each charging wire has an interior end 66. The interior end of each charging wire is within the chamber. Each wire has an exterior end 68. The exterior end of each wire is provided in proximity to the support tray. The exterior ends of the wires have a plurality of tips 70. The tips are of varying designs. In this manner a variety of electronic devices may be charged. The front of the chamber is positioned vertically inward of the front panel of the container. The back of the chamber is positioned vertically coextensive with the rear panel of the container and the rear edge of the support tray. The forward regions of the side sections have a high bottom. The bottom is horizontally coextensive with the bottom panel of the central section of the container. The rearward regions of the side sections have a low bottom horizontally coextensive with the support tray.

Provided last is an ultra-violet light 74. The light has an on/off switch 76 projecting rearwardly from a rearward door in the back of the chamber. The light has a printed circuit board 78 within the chamber. The printed circuit board includes a source of electrical potential 80. In this manner the charging wires, ultra-violet light and USB port 82 located on outer lower side panel are powered. The charging wires have a module 84. The module is provided forwardly and is slidable with respect to the chamber. The module supports the wires of the wiring harness. The module has a pivoting button 86. The pivoting button operatively functions with respect to the bottom panel of the container. In this manner the module is secured within the chamber during use. To replace worn out or damages charging sires, modules can be unsecured and replaced with a new module and charging wires.

In an alternative embodiment of the system 100, the support tray is provided forwardly of the chamber. The support tray has a charging matt 104. In this manner the charging matt is inductively coupled with electronic devices positioned on the charging matt to charge the electronic devices. Note the alternate embodiment shown in FIG.6.

Further embodiments of the invention may be seen in FIGS. 7-18. In FIGS. 7-10, the system 200 includes front panel of the container which has an upper edge 204 with a slot 206. A rectangular panel 208 is slidably received in the slot for displaying changeable graphic material. The front panel includes a forward backing plate 210 and a rearward backing place 212.

Figure 11:
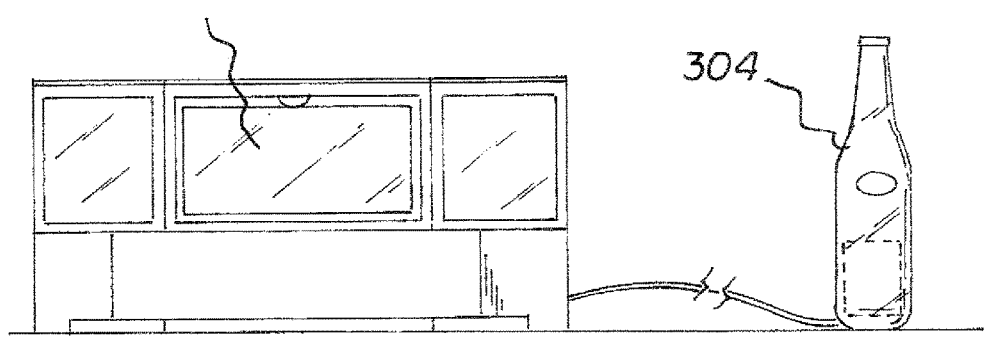
FIG. 11 is a front elevational similar to FIG. 7 but with a illuminated bottle.
Figure 12:
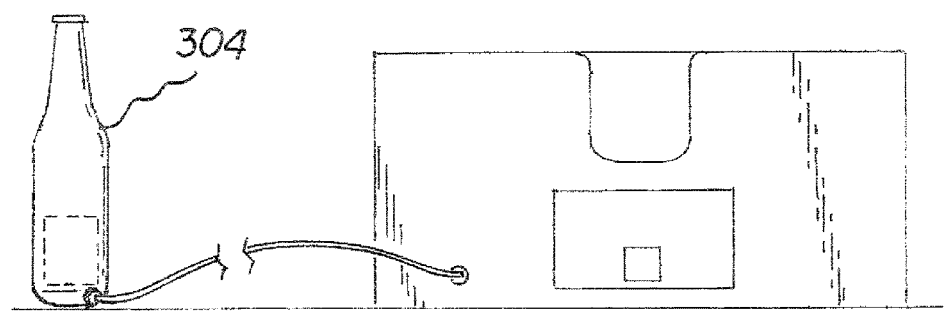
FIG. 12 is a rear elevational view of the FIG. 11 embodiment.

As illustrated in FIG. 11, the system 200 includes a front panel 212 of the container which is chosen from a class consisting of interchangeable graphic material inserts, a video LCD display screen, a chalk board, and a dry erase board.

The system 300, as seen in FIG. 13, includes bottle 304 with an internal bulb 306 powered from the housing.

Reference is now made to FIG. 14 wherein the system 400 further includes a bottle 404 with an internal bulb 406 within the bottle. Also within the bottle is a rechargeable battery 408 powering the bulb. The rechargeable battery is powered from the housing.

The system 500 as set illustrated in FIG. 15 includes a bottle 504 with an internal bulb 506 within the bottle and a rechargeable battery 508 within the bottle powering the bulb. The rechargeable battery is powered from the housing. The system further includes tips 510 of varying designs for charging a variety of electronic devices including cell phones.

As may be seen in FIG. 16, the system 600 includes a bottle 604 with an internal bulb 606 within the bottle. A rechargeable battery is within the bottle. The rechargeable battery powers the bulb and is powered from the housing. The system further including tips 610 of varying designs for charging a variety of electronic devices including cell phones. The system further includes a wireless charging dock 612 powered by the rechargeable battery for charging a variety of electronic devices including cell phones.

From the above descriptions, it may be seen that the present invention is a disposable condiment caddy equipped to selectively charge electronic devices via replaceable wire/cord charging leads side USB ports or inductive coupling on a wireless charging mat with a rear UV light. Also included are beer bottles with rechargeable internal batteries and/or LEDs inside for illuminated promotions and/or with charging harness port for plugging in charging harness cord and/or with power wire for recharging internal battery. A bottle charging dock charges bottle batteries and/or with multiple power charging cords and or with inductive coupling mat for wirelessly recharging bottle batteries equipped with the inductive coupling receiver. Any type of alcohol related items are used for containing, serving or packaging that could be converted into a charging device. Alcohol related items include a beer bottle, six pack box, beer mug, beer glass, keg, beer pitcher or the like.

A rechargeable bottle battery system is battery powered whereby a side bottle will deliver portable power to a charging station and also amplify promotional opportunities. Side power beer bottles have uses including rechargeable internal battery, and/or with LEDs, internal lights illuminating bottle housing and/or with charging harness ports. The system powers all caddy functions for exceeded periods and eliminates power cord and outlet need and maximizes exposure and promotional range. In addition, the bottle charging harness port is for portable bottle charging options.

Concerns eliminated are available electric outlets, powering near hazards. Bottles can be recharged by plugging directly into a wall power outlet or into the charging dock. The charging dock includes power charging ports and/or with inductive coupling mat for wirelessly recharging bottle batteries equipped with an inductive coupling receiver.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the following is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A universal cell charging station system (10) adapted to removably support disposable objects such as napkins, straws, stirrers and the like, the system also adapted to selectively charge a wide variety of hand-held: electronic devices including cell phones, the supporting and charging being done in a safe, convenient and economical manner, the system comprising, in combination:

a container (14) formed with a horizontal bottom panel (16), left and right side panels (18), a front panel (20) and a rear panel (22), the container having a rectangular central section (24) and laterally spaced triangular side sections (26), each of the side sections having a forward region (28) with a shallow first depth, each of the side sections having a rearward region (30) with a deep second depth, the second depth being greater than the first depth, each of the sections having an open top to facilitate the removable receipt of disposable objects, the objects being napkins and the like in the central section, the objects being straws and the like in the rearward regions of the side sections, and the objects being short items such as stirrers in the forward regions of the side sections, each side panel forming an angle of 60 degrees with the rear panel, each side panel having a vertical pocket (32) for the removable receipt of advertising material, each pocket having a transparent exterior plate (34) with light emitting diodes (36) above to illuminate the advertising material;

a support tray (40) positionable upon a recipient surface such as a counter, table top and the like, the support tray having a front edge (42), a rear edge (44), and laterally spaced side edges (46), the rear edge of the support tray being vertically aligned with the rear panel of the container, the front edge of the support tray being vertically outwardly of the front panel of the container;

a chamber (50) formed with a front (54) and a back (56), lateral sides (58) and a top (60) and bottom (62), a plurality of charging wires (64) forming a wiring harness, each charging wire having an interior end (66) within the chamber, each charging wire having an exterior end (68) in proximity to the support tray, the exterior ends, of the charging wires having a plurality of tips (70) of varying designs for charging a variety of electronic devices, the front of the chamber being positioned vertically inward the front panel of the container, the back of the chamber being positioned vertically coextensive with the rear panel of the container and the rear edge of the support tray, the forward region of each of the side sections having a high bottom horizontally coextensive with the bottom panel of the central section of the container, the rearward region of each side section having a low bottom horizontally coextensive with the support tray; and an ultra-violet light (74) with an on/off switch (76) projecting rearwardly from a rearward doer in the back of the chamber, a printed circuit board (78) within the chamber, the printed circuit board including a source of electrical potential (80) for powering the charging wires and the ultraviolet light, a module (84) forwardly slidable with respect to the chamber supporting the charging wires of the wiring harness, a pivoting button (86) operatively functioning with respect to the bottom panel of the container to secure the module in the chamber during use.

\* \* \* \* \*